(12) United States Patent
Harris

(10) Patent No.: US 7,692,404 B2
(45) Date of Patent: Apr. 6, 2010

(54) CHARGING CONTROL IN AN ELECTRIC VEHICLE

(75) Inventor: Scott C Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 189 days.

(21) Appl. No.: 11/860,537

(22) Filed: Sep. 24, 2007

(65) Prior Publication Data

US 2009/0079384 A1 Mar. 26, 2009

(51) Int. Cl.
*H02J 7/00* (2006.01)
(52) U.S. Cl. .................. 320/117; 320/101; 307/37; 307/71
(58) Field of Classification Search .......... 320/101, 320/102, 117; 307/37, 71, 110
See application file for complete search history.

(56) References Cited

U.S. PATENT DOCUMENTS

| | | | | |
|---|---|---|---|---|
| 5,637,980 A * | 6/1997 | Wu | ............... | 320/128 |
| 6,034,506 A * | 3/2000 | Hall | ............... | 320/117 |
| 6,082,476 A | 7/2000 | Stulbach | ............... | 180/65.25 |
| 6,140,799 A * | 10/2000 | Thomasson | ............... | 320/117 |
| 6,430,692 B1 * | 8/2002 | Kimble et al. | ............... | 713/300 |
| 6,559,655 B1 * | 5/2003 | Rosenthal et al. | ............... | 324/634 |
| 6,734,645 B2 * | 5/2004 | Auerbach | ............... | 318/139 |
| 6,757,597 B2 | 6/2004 | Yakes et al. | ............... | 701/22 |
| 6,930,404 B1 * | 8/2005 | Gale et al. | ............... | 290/40 C |
| 7,075,194 B2 * | 7/2006 | Weidenheimer et al. | ...... | 307/71 |
| 7,208,894 B1 | 4/2007 | Earle | ............... | 318/105 |
| 2004/0036446 A1 | 2/2004 | Iwashima | ............... | 320/116 |
| 2005/0029026 A1 | 2/2005 | Heinen | ............... | 180/65.5 |
| 2005/0035741 A1 | 2/2005 | Elder et al. | ............... | 320/116 |
| 2005/0052080 A1 | 3/2005 | Maslov et al. | ............... | 307/10.1 |
| 2005/0110460 A1 | 5/2005 | Arai et al. | ............... | 320/116 |
| 2006/0162973 A1 | 7/2006 | Harris et al. | ............... | 180/65.3 |
| 2006/0278449 A1 | 12/2006 | Torre-Bueno | | |

* cited by examiner

*Primary Examiner*—Edward Tso
*Assistant Examiner*—Ramy Ramadan
(74) *Attorney, Agent, or Firm*—Law Ofc SC Harris

(57) ABSTRACT

A charging system for a vehicle rearranges the bank of battery cells between a series connection for delivering voltage to a load, e.g. a motor; and a parallel connection for being charged. The battery bank can thus be charged by a 12 volt battery charger. The charger can be a plug in charger, or can be a solar cell. For example, the solar cell can be moved to cover a windshield or other surface of the vehicle whenever the vehicle is shut down.

8 Claims, 3 Drawing Sheets

CHARGING CONTROL IN AN ELECTRIC VEHICLE

BACKGROUND

Many are concerned about global warming. It is widely believed that the amount of carbon dioxide entering the atmosphere is causing significant damage to the earth and its ecosystem.

While accurate numbers are difficult to obtain, it is believed that approximately one quarter of the carbon dioxide is a byproduct of mammal breathing. Another quarter is produced by internal combustion engines such as automobiles. The final half is produced by industrial processes.

Whatever the reality, it is for sure that reducing carbon dioxide emissions from automobiles will reduce, at least partially, global warming. Reduction of carbon dioxide emissions from a vehicle is difficult at best and may reduce the vehicle's efficiency.

Different suggestions for reducing the already existing levels of carbon dioxide in the air have been made. A few of these are described here.

A perhaps "obvious" way to reduce carbon dioxide emissions is to use plants and trees—to make sure that there are enough plants planted to photosynthesize carbon dioxide back into oxygen. Unfortunately, most studies show that there is not enough free area on the earth to plant enough plants to reverse the CO2 effect. Moreover, the planted area on the earth is reducing, not increasing, as developing nations tear down forests to make way for civilization.

Certain plants, notably bamboo, has a much higher carbon dioxide scrubbing capability than others-bamboo is believed to have triple the CO2 scrubbing capability of other plants. More planted bamboo could reduce the carbon dioxide level. It is unlikely that enough open area on the earth exists (and will remain open) to bring carbon dioxide under control using only plants.

So, how do we reverse the effects?

Suggestions have included carbon dioxide sequestration, where the carbon dioxide from the atmosphere is concentrated, and maintained in some isolated locations such as underground. Some have suggested pumping carbon dioxide into the wells that produce oil, or otherwise underground. People have suggested replacing coal powered utilities with nuclear power to avoid carbon dioxide production. Other carbon landfills have also been suggested. It has been suggested to boost the carbon dioxide out into space or orbit. Suggestions have been made to generate power in space from solar power. A solar sunshade has also been suggested, which would reduce the amount of sunlight on the earth.

Hybrid and/or electric vehicles can reduce the amount of fuel consumption. Solar charging of an electric vehicle uses no fuel and causes no carbon dioxide production. However, many have claimed that solar charging for an electric vehicle is impractical.

SUMMARY

The present application describes aspects including a first aspect that facilitates charging batteries within an electric-driven vehicle, such as an electric vehicle or hybrid vehicle.

Another aspect describes using the otherwise-unused surface areas on a vehicle to capture solar energy in a way that stores energy for use in driving the vehicle at a later time.

Another aspect explains how electric vehicle batteries can be charged in a more economical way.

Another aspect describes using the solar cells only when the vehicle is not in use.

An aspect describes placing solar cells on movable platforms that cover areas where a user could not have solar cells during driving: such as in the front windshield or rear mirror.

Another aspect describes a simplified way of charging batteries in an electric-driven vehicle.

DETAILED DESCRIPTION

Studies have suggested that there is likely not enough area to plant enough plants to scrub enough CO2 out of the atmosphere to solve the global warming problem. The undersigned recognizes, however, that one area that is largely unused is certain surfaces of an automobile, especially the areas of the windshield and back window when parked. The roof, windshield, and other parts of the automobile soak up large amounts of energy from the sun, which is completely wasted. In fact, this is undesirable, and many people use sun blocking shades in their windshield to reduce the amount of energy absorbed by the vehicle.

Each automobile has an internal combustion engine and produces some carbon dioxide output. While various techniques have been used to try and scrub the output gases from the automobile, these techniques each have their own host of disadvantages. Some of these techniques may make the operation of the internal combustion engine process less efficient.

The present application therefore considers an alternative paradigm. Instead of producing energy that is used for the automobile while the automobile is operational and moving, or trying to scrub the output from the automobile while it is running, one aspect uses surfaces of the automobile during times when the automobile is not otherwise in use. Most automobiles are used for between one to two hours per day, and the rest of the time left parked. During the time that the car is parked, its surface area is used to capture solar rays, and those solar rays are used in a way that may prevent or reduce carbon dioxide pollution. The surface area may be used to power the automobile itself, or may use some kind of carbon dioxide scrubbing.

Solar automobiles have been suggested. However, most suggestions of solar cells suggested that solar technology is not sufficient to assist with vehicle operations. Techniques to allow solar cells to become practical are also disclosed.

Figure 1:
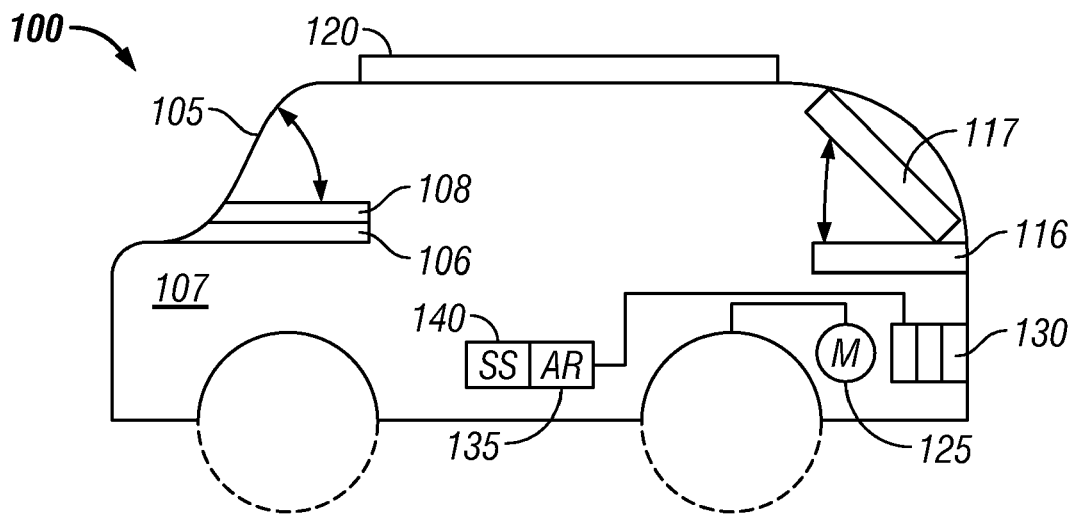
FIG. 1 shows a vehicle with movable solar cells.

An embodiment is shown in FIG. 1. In the FIG. 1 embodiment, the automobile 100 includes a windshield 105, a roof 110, and a rear window 115. Both the front window and the rear window have associated solar cells. The solar cell 106 for the front window is movable between its stowed position 107, and an active position where it blocks the entire windshield 105. When moved into this active position, the solar cell in effect is put into the position of a sun screen. Often people put up sun screens when they park their cars because parking in the sun overheats the car. An embodiment places a solar cell in place of the sunscreen, to accept solar energy. The solar cell is preferably a flexible solar cell which can be somewhat deformed when placed into its stowed position. In one embodiment, the solar cell normally rests on the dashboard, and a covering 108 may also extend over the dashboard. As explained herein, when the car is parked and sun is detected, a controller operates linear motors to remove the covering 108, and extend the solar cell 106 to a position completely covering the windshield. In a similar way, the solar cell 116 is extendable into the position shown at 117 to cover the rear window. Another solar cell, such as 120 may be on the roof. In one embodiment, the solar cell may be mountable in a sunroof, to prevent theft or otherwise.

The vehicle 100 is an electrically-operable vehicle that takes some or all of its electric power from stored battery charge. Vehicle 100 may be an electric vehicle or a hybrid vehicle. The vehicle may include an electric motor 125 driven by a battery pack 130.

The battery pack 130 is formed of a number of connected battery cells, e.g., at least 3 battery cells, each having positive and negative battery terminals. In an embodiment, the batteries (via their battery terminals) are connected in two different ways depending on whether the automobile is operating or non-operating and charging. During operation, the batteries are connected in series to output a high voltage output to drive the motor 125. For example, the battery output may be 250 volts in a conventional hybrid vehicle. The 250V output may be inverted and increased to an even higher voltage such as 500 V, to drive the motor 125.

The high voltage output of the battery cells has been an impediment to charging these batteries. The charging has typically required an output voltage of 90-250V DC to charge the batteries. An embodiment described herein describes re-connecting the battery bank during 'offline' charging operation, that is during the time when the batteries are being charged but the vehicle is not operating.

A reconnection mechanism 135 allows rearranging the batteries from their series configuration, where the series connection produces 250 V, to a parallel configuration where all the battery cells are connected in parallel to produce 12 V, and can be charged by a single 12 volt charger. The reconnection mechanism can be, for example, a high-voltage/high current contactor style relay, which are conventionally available.

A soft start circuit 140, may be used as part of the reconfiguration to reduce the amount of transient current flows.

Figure 2A:
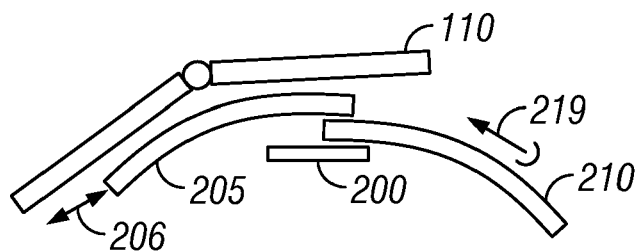
FIGS. 2A and 2B show different ways of moving the cells.

The embodiment in FIG. 1 shows the solar cells such as 106 being extendable up into the windshield. However, flexible solar cells may also be extendable downward. The roof 110, for example, may have a hollow portion shown as 200 in FIG. 2A. That includes flexible or curved solar cells therein, for example, flexible solar cells available from Silicon Solar Inc. The solar cell 205 may be movable in the direction of the arrow 206 to cover the windshield. The solar cell 210 may be movable into position 211 to cover the rear window. Both of these solar cells may normally be stored within the roof of the vehicle and extended only when the vehicle is parked, and sun is detected.

Figure 2B:
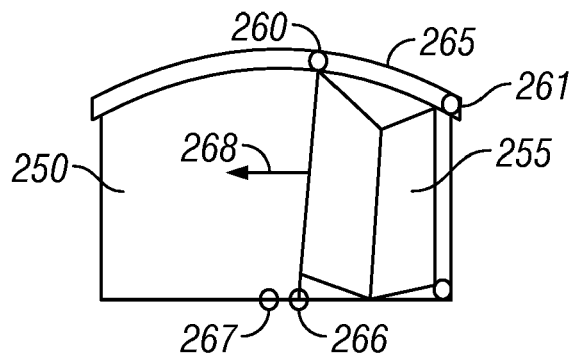

FIG. 2B illustrates an unfolding or unfurling solar cell 255. As shown in FIG. 2B, the solar cell 255 may unfold in accordion style, much like a conventional accordion style folding sunscreen device. In the embodiment, however, the alternate edges of the solar panel 260, 261, may be held within a rail 265. Similarly, the bottom edges such as 266 may be analogously held. A motor such as 267, may move the overall device to open it in the direction of the arrow 268 or close it in the opposite direction. When closed, in the accordion embodiment, the solar cell sits flush against a portion of the windshield. In another embodiment, the solar cell may uncoil like a scroll, so that one part of this scroll sits against the windshield when coiled, but when uncoiled extends across the windshield. Again, the scrolling embodiment may travel on rails at the top and/or bottom. The scroll may also be spring mounted, so that the motor pulls the solar cell into place, but removing power from the motor allows the solar cell to return to its stowed position.

Figure 3:
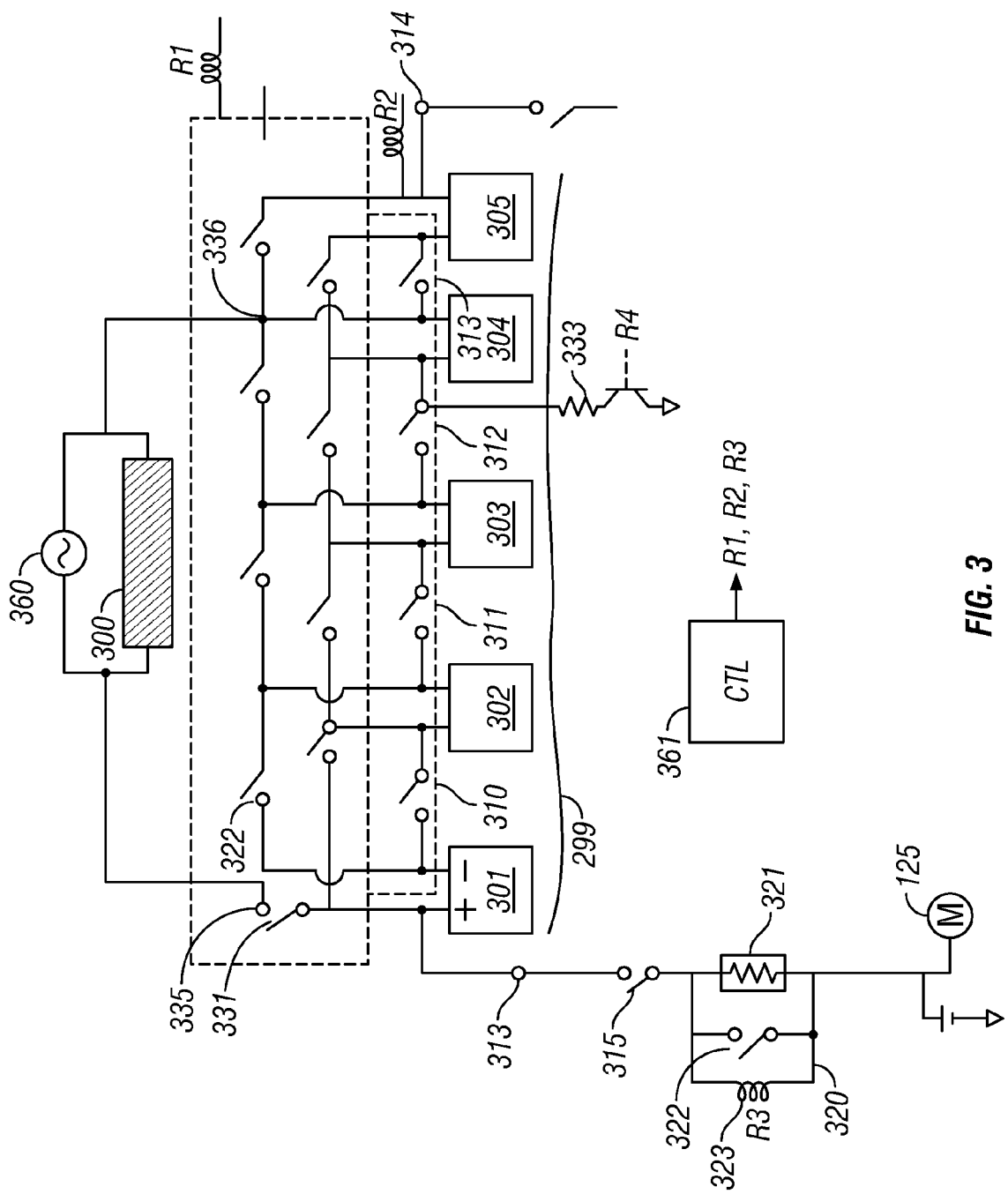
FIG. 3 shows a battery circuit.

FIG. 3 illustrates the reconfiguration system of an embodiment.

Many have suggested that present solar cell technology is not sufficient to assist with charging of hybrid vehicles. A solar cell has a theoretical efficiency of 24%, and real solar cells may have efficiencies between 10-20%. Solar cells can easily produce wattage outputs sufficient to assist in charging a battery in a solar cell. It is believed that the reason for the conclusion of insufficiency of a solar cell, was that it is difficult to obtain the necessary charging voltage, for example 250 V, from a solar cell. This is based on a basic misunderstanding of the way that these high voltage cells should be charged.

As of the writing of this document, hybrid vehicles have batteries which store between 1 kWh and 1½ kWh. The Toyota Previa, for example, stores, about 1½ kilowatt hours in its battery bank.

A current, state of the art, hardened solar cell (e.g. a marine solar cell for use on a boat), produces 100 watts of output. Even assuming only 5 hours of illumination per day means that this will produce 0.5 KWH each day. A 200 watt or larger cell can be used to increase the charging capability. Parking in the sun also allows (especially in many climates) an expected charging time of more like 8 hours.

A vehicle that, therefore, is parked in the sun all day, could produce 800 W hours with a 100 watt solar cell—almost the entire charging capacity of the battery. In other words, the battery could be almost fully charged by the sun during this time—if the voltage issue could be handled.

Another aspect of this invention describes two different battery packs—a first conventional battery pack that is charged from regenerative charging in the vehicle, and a second battery pack, charged via external charging, e.g., solar or plug in. The two battery arrays are placed in parallel, during operation of the vehicle, so that either can power the electric powered systems.

Alternately, a single battery array can be used. This battery array can be charged by the external charge source as described herein.

FIG. 3 illustrates the embodiment. An external charge source may be a plug in charger, or a solar cell, which may be an array of solar cells such as shown in FIG. 1 or 2. The external charge source is shown generically as 300. The charge source 300 is arranged to produce a 12 V output. In the embodiment, the batteries in the battery array are reconfigured between two voltages. A high voltage arrangement where the batteries are connected in series to get a high voltage to drive the motors in an electric or hybrid vehicle. A lower voltage arrangement places the batteries all in series, to allow them to be charged by a 12 volt charger.

FIG. 3 shows the battery bank 299 including five batteries, 301, 302, 303, 304 and 305. While only five batteries are shown for simplicity, it should be understood that a hybrid vehicle or electric vehicle may have many more batteries, e.g. 20 to 25 batteries. The connection shown in FIG. 3 is the same for 5 batteries, or any number of batteries, e.g. 20-25 batteries.

Relays R1 and R2 rearrange the connection of the batteries between series and parallel. The relays are connected to terminals of the batteries. Both relays are normally open relays, so that the default is that the contacts fail open. Alternatively, a single relay with sufficient number of contacts can be used.

This embodiment uses two separate battery banks, the reconfigurable bank 299, and the conventional regenerative bank 350. Regenerative bank 350 may operate off regenerative means such as conventional means in a vehicle.

The relay R2 has its contacts connected in series between terminals of the batteries of the bank 299. When the relay R2 is energized, its corresponding contacts 310, 311, 312, 313, 314 are closed. This closure connects the the batteries of the bank 299 into a series connection between the first positive node 313, and the last negative node 314. If 20 batteries are connected in series, the resulting voltage between the nodes 313, 314 is approximately 250 V.

Another relay contact 315 may be part of relay R2, or may be a separate relay. This contact is also closed to connect the series connected battery bank in parallel with the regenerative battery 350 if present, and to the electric motor 125.

In the embodiment, the voltage output of the bank 299 may be charged to a different voltage then that of the regenerative battery 350, since the banks 299 and 350 are being charged using different means. This voltage level may cause high current flow between the batteries until voltage equalization occurs. A current limit/soft start circuit 320 may be connected at first to limit the current surges.

Soft start circuit 320 includes a resistance 321, for example 50 ohms, with a relay contact 322 connected across the resistance. When the battery is first connected, current flow is through the resistance. The resistance limits the current flow. After a few seconds, the voltage may equalize. Auxiliary contact 322 is then closed to reduce the series resistance to near zero. Auxiliary contact 322 may be controlled by a controller, or may be simply closed when the relay coil 323 gets to a specified voltage point indicating that the voltages have stabilized. During charging mode, the relay contacts of R2 are opened to remove the series connection.

Relay R1 has its contacts connected to place all the battery cells within the bank 299 in parallel with one another. In the connection shown, R1 has twice as many contacts as R2, shown as 331, 332, . . . . The relay contacts 331, 332 . . . place each of the batteries 301, 302, 303 . . . into a parallel connection with one another. In this parallel connection, the voltage (e.g., 12 v) appears between nodes 335 and 336. In another embodiment, there may be additional circuitry to reduce voltage transients during switching between series and parallel.

A charging system, here either or both of solar cell 300 and/or plug in charger 360, is connected to all of the batteries 301, 302, 303, 304 . . . in parallel.

A 12 V output from the charging system, e.g. the solar cell 300, charges each of the batteries in parallel. That 12 V charging voltage is removed during operation of the motor 125.

The plug-in charger, 360, for example, may be a relatively inexpensive 12 V charger. For example, even a charger that produces 200 W will fully charge the battery overnight. Moreover, since 12 V charging systems are relatively cheap, and the technology is well established, this facilitates the technology of a plug-in charger.

When the plug-in charger 360 is used, for example, both banks of batteries could be charged by that charger. Moreover in an alternative embodiment, there is only one bank of batteries that is charged by solar/plug in when idle, or by regenerative means when the vehicle is operating.

Figure 4:
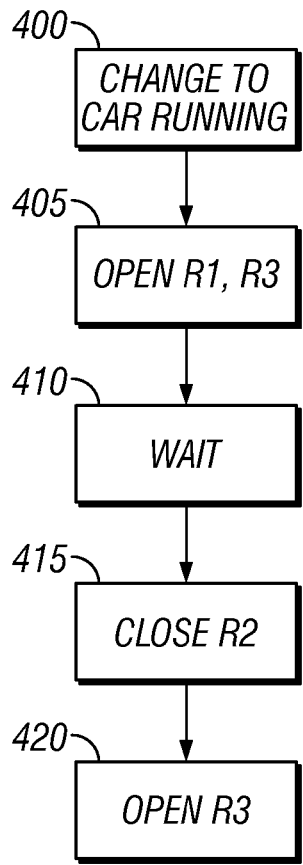
FIGS. 4 and 5 show operational flowcharts.

The operation follows the flowchart of FIG. 4, which is controlled by the controller 361 in the vehicle.

At 400, the controller sensors a change to a condition where the automobile is running. When the automobile starts running, the system opens R1 and R3. By opening R1, the battery bank is taken out of its parallel connection, and since relay two is already open, all contacts are floating. 410 represents a waiting period which should be one to two seconds, which allows the voltages on the battery terminals to equalize slightly e.g. through the internal resistance of the batteries.

Since the batteries were in series, the highest voltage on those batteries should be 12 V, so the waiting at 410 can be a relatively short period.

At 415, relay R2 is closed, placing the batteries into series with one another. This produces a high voltage output at node 313. After a specified time, allowing the voltages at 313 to equalize with the voltage of the regenerative battery 350, the relay R3 is opened.

The vehicle can then operate normally.

Figure 5:
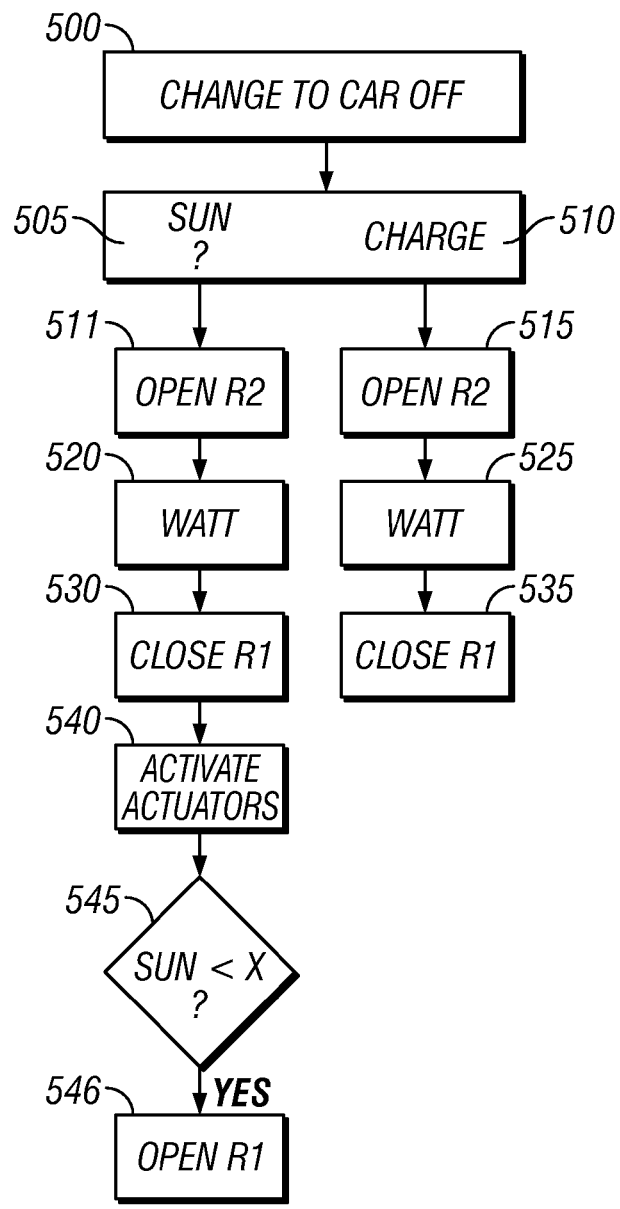

FIG. 5 represents the flowchart, which is executed when there is a change to the car being off at 500. 505 represents the detection of whether there is sun. This may use a fixed solar cell, and a test of the output voltage of that solar cell to determine whether the sun is over a specified in now. If there is no sun, no operation may be carried out at this point. Alternatively, a charging operation with a plug-in charger at 510 can be detected. Either charging operation has the same effect.

In both sun (511) and plug in charge (515), R2 is opened.

Note that in the case of R2 being opened, some of the batteries will have relatively high voltages on their terminals. For example, the battery terminal on 304, if it is the 21st battery, may have 180 V between its + terminal and ground, even though there is only 12 v across its terminals. This is only a potential, which should quickly dissipate through the internal resistance of the battery. As an alternative, a very high resistance, such as 100 K. to 1M ohm, shown as resistance 333 may be quickly grounded through a switch 334. The switch can be an electronic switch, e.g., a FET, since the amount of current will be negligible.

The waiting period at 520/525 again allows these voltages to equalize. During this waiting period, the switches such as the FET 334 may be activated.

After the waiting period, at 530 535, the relay R1 is closed, all of the batteries in the bank 299 are connected into parallel, enabling them to be charged by a single global charger.

This completes the charging connection, but an additional step of 540 is carried out in the solar operation of activating the actuators to allow the solar devices to cover the windshield and/or roof and/or back window and/or other surfaces.

At 545, a sun<x routine is run, in which when the sun goes lower than a specified amount, the relay R1 may be opened at 546 in order to save energy.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other numbers of batteries can be used, and other charging devices, as well as other connection devices besides relays. Solid state switches may be used.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

The batteries described herein can be any rechargeable type, e.g., nickel-metal hydride, nickel-cadmium, lead acid, lithium ion, or others.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A battery system for a vehicle, comprising:
   at least three battery cells, each said battery cell having a positive battery terminal and a negative battery terminal;
   a battery terminal reconfiguration device, including a first connection part that connects said terminals of said battery cells into a series connection in a first mode which provides an additive connection of voltages of said battery cells, and connects said cells of said battery into a parallel connection in a second mode which provides a connection of said voltages of said battery cells that is substantially the same as at least one of said battery cells; and
   a controller for said reconfiguration device, which configures said cells between said first mode and said second mode and which actuates at least one switch and at least one resistance to dissipate at least one transient voltage at a node between said battery cells when changing between said first mode and said second mode to reduce an amount of difference between said additive connection and said series connection when switching between said first mode and said second mode.

2. A system as in claim 1, wherein said controller detects that the vehicle is running, and responsive to detecting that said vehicle is running, causes said battery cells to reconfigure into said series connection, and to produce an output voltage equivalent to a sum of all of the battery voltages summed together, and detects a second mode, where the vehicle is not running, and responsive to detecting said second mode where said vehicle is not running, reconfigures the battery connections so that the batteries are connected in parallel.

3. A system as in claim 2, further comprising a charging mechanism, producing an output voltage that is substantially the same as a voltage of a single one of said battery cells, said charging mechanism connected to said batteries when configured into said parallel connection.

4. A system as in claim 3, wherein said charging mechanism is a solar cell that moves to a first position when said vehicle is running, and moves to a second position when said vehicle is not running.

5. A method comprising:
   while operating an electrically driven vehicle, arranging an array of battery cells in the electrically driven vehicle, to a first electrical connection between the cells in which power is drawn from said cells; and
   while not operating the electrically driven vehicle, arranging said battery cells in a second different electrical connection between the cells during charging mode of the vehicle in which power is not being drawn from said cells;
   wherein said first electrical connection is a series connection and said second connection is a parallel connection; and
   wherein a controller configures said cells between said series connection and said parallel connection and actuates at least one switch and at least one resistance to dissipate at least one transient voltage at a node between said battery cells when changing between said series connection and said parallel connection to reduce an amount of difference between said series connection and said parallel connection.

6. A method as in claim 5, wherein said arranging uses two different sets of electrical connections, and both sets of connections are normally not connected.

7. A battery system for a vehicle, comprising:
   at least two battery cells, each said battery cell having a positive battery terminal and a negative battery terminal;
   a battery terminal reconfiguration device, including a first connection part that connects said terminals of said battery cells into a series connection in a first mode, said first mode formed by first connections which are normally disconnected, and are energized to connect, and said first mode providing an additive connection of voltages of said battery cells, and wherein said first connection part also connects said cells of said battery into a parallel connection in a second mode which provides a connection of said voltages of said battery cells that is substantially the same as at least one of said battery cells, said second mode formed by second connections which are normally disconnected, and are energized to connect; and
   a controller for said reconfiguration device, which configures said cells between said first mode and said second mode and which actuates at least one switch and at least one resistance to dissipate at least one transient voltage at a node between said battery cells when changing between said first mode and said second mode to reduce an amount of difference between said additive connection and said series connection when switching between said first mode and said second mode.

8. A system as in claim 7, wherein said first connection part includes two separate sets of normally open contacts which are respectively closed.

* * * * *